Feb. 4, 1964

F. D. WERNER ETAL 3,120,123

STATIC PRESSURE PROBE

Filed Nov. 8, 1960

INVENTOR.
FRANK D. WERNER
BY RICHARD V. DE LEO
Dugger & Johnson
ATTORNEYS

Feb. 4, 1964   F. D. WERNER ETAL   3,120,123
STATIC PRESSURE PROBE
Filed Nov. 8, 1960   5 Sheets-Sheet 2

INVENTOR.
FRANK D. WERNER
BY RICHARD V. DE LEO
Dugger & Johnson
ATTORNEYS

INVENTOR.
FRANK D. WERNER
BY RICHARD V. DeLEO
Dugger & Johnson
ATTORNEYS

United States Patent Office 3,120,123
Patented Feb. 4, 1964

3,120,123
STATIC PRESSURE PROBE
Frank D. Werner, Minneapolis, and Richard V. De Leo, Hopkins, Minn., assignors to Rosemount Engineering Company, Minneapolis, Minn., a corporation of Minnesota
Filed Nov. 8, 1960, Ser. No. 68,085
12 Claims. (Cl. 73—182)

This invention relates to the measurement of the static pressure and Pitot-static pressures of aerodynamic vehicles, and particularly to the measurement of such pressure or pressures on aerodynamic vehicles which move at speeds which may range from subsonic to supersonic for the same vehicle. At speeds below sonic speed the movement of the vehicle will cause an increase in air pressure which can be sensed many feet ahead of the vehicle, and at or near the vehicle the pressure is increased to an amount substantially more than the pressure in space at a position removed from the vehicle. For a constant vehicle speed the increment of increase of static pressure, as compared to true static pressure in space, gradually increases from a true value at a position in space well ahead of the vehicle, until reaching a maximum increase at the surface of the vehicle. At a certain fixed position ahead of the vehicle, the increment of increase in static pressure will become gradually larger as the vehicle speed is increased, until at a speed equal to or slightly exceeding sonic speed the "static pressure" increment of increase reverts to zero, or stated another way, the static pressure reverts to true static pressure ahead of the shock waves generated by the vehicle, and this is close to the vehicle.

The selection of location for the static pressure port (or Pitot-static ports) is therefore fraught with difficulty, and it is to such problems that this invention is addressed.

It is an object of this invention to provide improved aerodynamic shapes and locations of static port or Pitot-static ports thereon whereby measurements of "static pressure" or "Pitot-static pressures" are provided which are subject to less error than previously.

It is another object of the invention to provide improved aerodynamic shapes and having or Pitot-static ports thereon which are self-compensating in respect to static pressure errors occasioned by movement of the vehicle at less than sonic speeds and which provide true values at greater than sonic speed.

Other and further objects are those inherent in the invention herein illustrated, described and claimed and will be apparent as the descripiton proceeds.

To the accomplishment of the foregoing and related ends this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings wherein.

Figure 1:
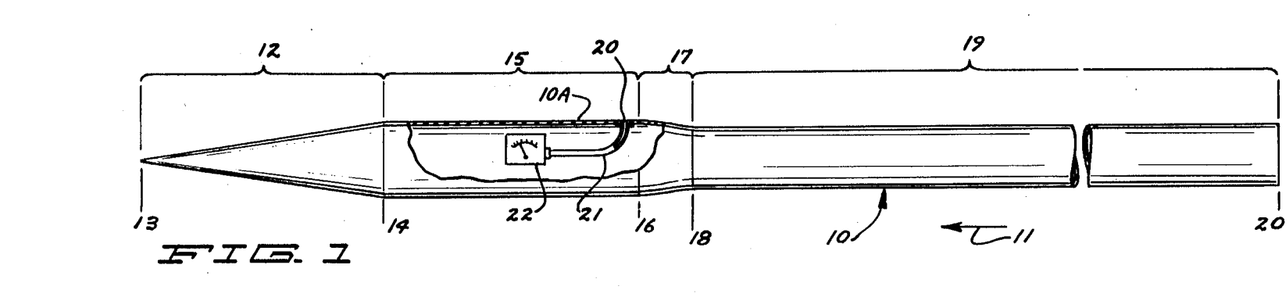
FIGURE 1 is a schematic side elevational view partly broken away and partly in section showing one form of the invention.
Figures 14, 16:
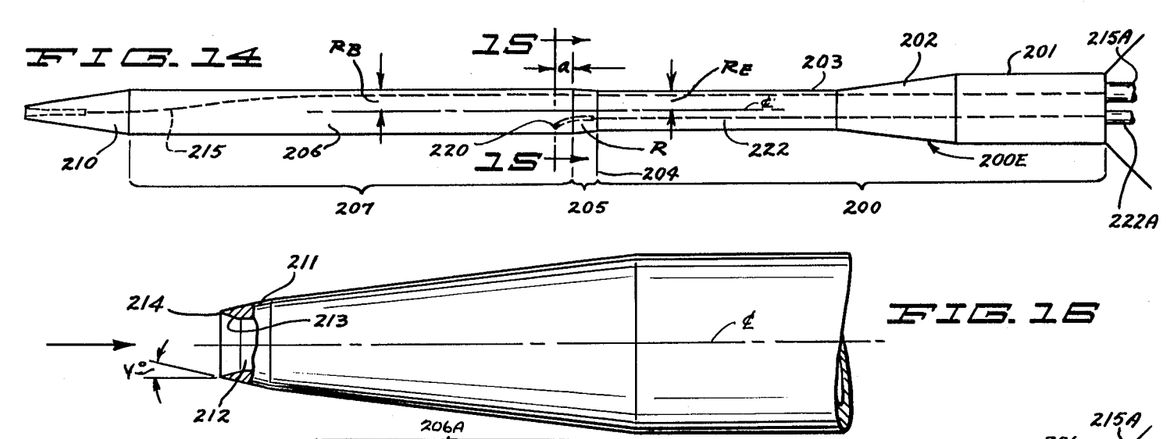
FIGURE 14 is a side elevational view of an exemplary specific form of Pitot static probe constructed in accordance with the invention and of a type used on a vehicle as shown in FIGURE 4.
FIGURE 16 is an enlarged fragmentary side elevational view, partly broken away, showing the nose portion of the probe illustrated in FIGURE 14.
Figures 15, 17:
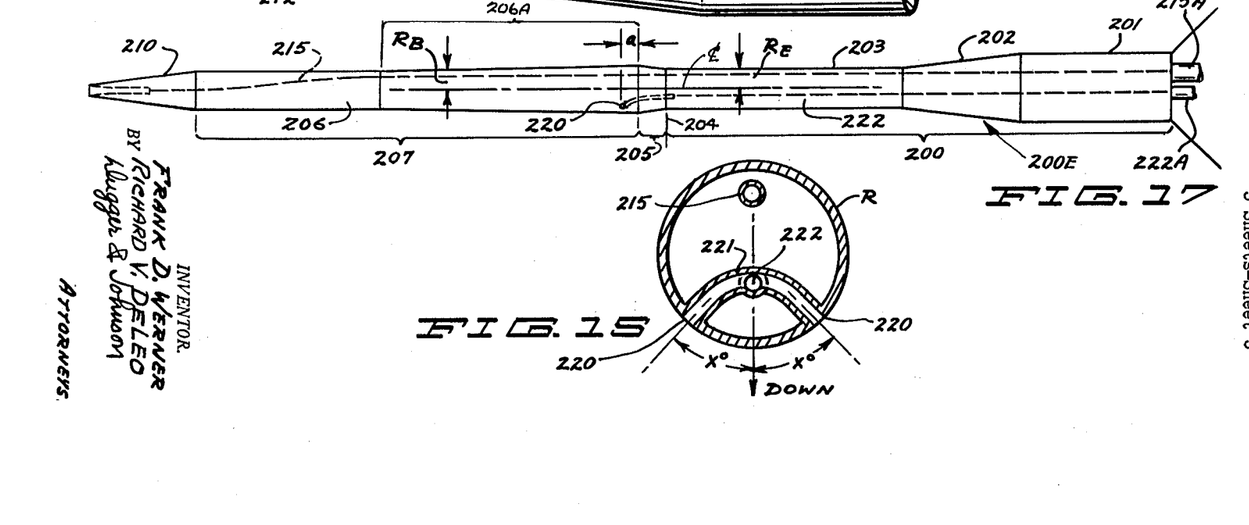
FIGURE 15 is an enlarged transverse sectional view taken along the line and in the direction of arrows 15—15 of FIGURES 14.
FIGURE 17 is a side elevational view of another specific illustrative slightly modified form of probe constructed in accordance with the invention and similar to that shown in FIGURE 14.

Referring to FIGURE 1, there is illustrated an aerodynamic vehicle generally designated 10, which, in motion, moves to the left in FIGURE 1, in the direction of arrow 11. The device has a conical nose, shown under the bracket 12, which increases in cross-section from the forward pointed end 13 to a maximum cross-section at 14. Ordinarily a vehicle of this type is made of circular cross-section, though not necessarily so. Behind the nose i.e. next to the right in FIGURE 1, there is a section shown under the bracket 15 known as the body section which is of constant or very slightly changed cross-section. Thus the body section may slightly taper to either increase slightly or decrease slightly in the downstream direction, but the taper is slight, and is much less than the nose taper. This body portion terminates at the line 16. Behind the body (i.e. next to the right in FIGURE 1) there is a reducer section shown under the bracket 17, in which the cross-sectional area of the vehicle is decreased from the size shown at 16 to the size shown at 18. Behind the reducer section (i.e. next to the right in FIGURE 1) there is a stem or tail section of constant cross-sectional dimension throughout most of its length as under bracket 19 which terminates at the trailing end 20. In some instances the stem may be enlarged at or near its termination as illustrated in FIGURES 14 and 17 hereof. The nose, body, reducer and stem may be integral or separate pieces fastened together, and they are all arranged co-axially.

The propulsive, payload and steering devices of the vehicle are not illustrated since they do not per se constitute any part of this invention. At a point which is behind the nose section 12 and which is ahead of the reducer section there are provided one or more static pressure ports 20 in the sidewall 10A of the vehicle. One port is illustrated at 20, but if several are used they are spaced angularly around the body as in FIGURE 15. This port 20 is connected by a tube 21 to a suitable pressure operated instrument 22, which may be of the type which measures absolute pressure, or reference pressure. The instrument 22 may be of the barometric type and if it is a reference pressure instrument the reference pressure may be the Pitot pressure, where this is determined on the vehicle, as shown in FIGURE 2, or the reference pressure may be a separate standard pressure.

As illustrated in FIGURE 1, the instrument 22 is of the type which measures absolute pressure at the port 20.

The port (or ports) 20 may be at any longitudinal position along the body section from a location at line 16 (which is the beginning of the reducer) to a point near the line 14 (which is the end of the nose). If more than one port is used they need not necessarily be at the same longitudinal position but they may be. If more than one port is used they are manifolded together as in FIGURE 15. The preferred location along the body at which the port is located is at a location ranging from vicinity of line 16 forwardly to but not substantially exceeding two-thirds of the length of body section 15, as measured forwardly from the line 16. At speeds which range up to a point slightly greater than sonic speeds, the effect of the reducer section will be felt at the port 20 and will cause a slight decrease in pressure.

Figure 2:
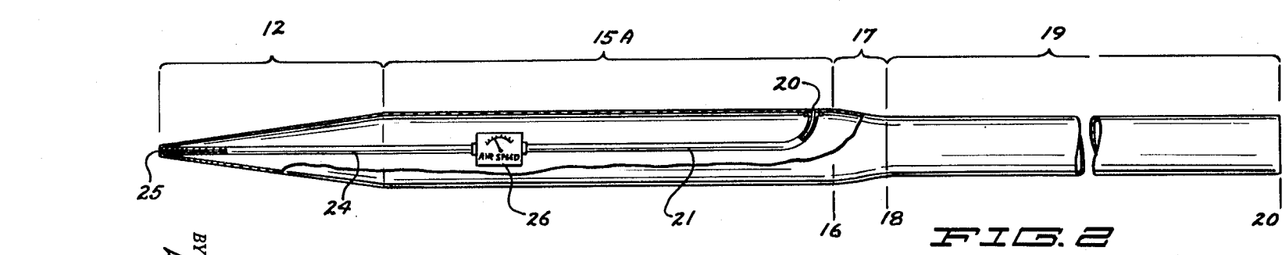
FIGURE 2 is a schematic side elevational view partly broken away and partly in section, and showing another form of the invention.

The relative length of the sections 12, 15 and 18 of the vehicle shown in FIGURE 1 may be varied and this is illustrated in FIGURE 2 where the nose section 12 is of substantially the same length but the section 15A is substantially increased in length whereas section 17 and 18 are kept approximately the same.

Figure 3:
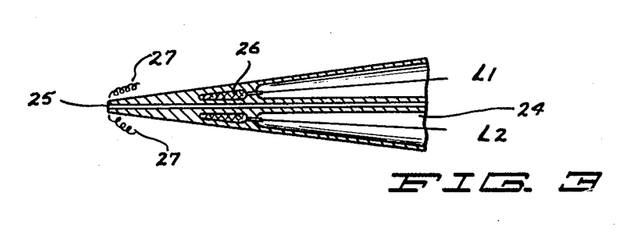
FIGURE 3 is an enlarged fragmentary longitudinal sectional view through the nose section of the device shown in FIGURE 2, showing a slightly modified construction of the invention.

In FIGURE 2 provision is also made for the measurement of "Pitot" pressure. This is accomplished as shown in FIGURE 2 and in the enlarged view, FIGURE 3, by extending a tube 24 forwardly in the vehicle to a forwardly directed aperture 25 in the nose of the vehicle. In FIGURE 3 there is illustrated an imbedded heater 26 which is fed by electric power lines L1 and L2, which serves to elevate the temperature of the forward (or nose) end 12A of the nose section 12 to prevent icing. In FIGURE 2 the instrument 26 is of the differential pressure type, and it is actuated by the difference in the "Pitot" pressure applied through line 24 and of the "static" pressure applied through line 21 from port 20. The provision of the Pitot port 25 at the forward end of the nose section will occasion a little disturbance as indicated at 27—27, at speeds which are less than sonic speeds and such disturbance will be felt back to some extent along the nose section 12 and along the section 15. For this reason it is desirable, where a port for sensing a Pitot pressure is incorporated in the nose of the vehicle, to increase somewhat the length of the body section 15, as shown at 15A in FIGURE 2, and/or to locate the port 20 along the more rearward reaches of the body section 15—15A, rather than at some position forwardly along this section.

It may be stated parenthetically that the effect of the conical nose section 12 at subsonic speeds is the same as the effect of the reducer section 17 insofar as concerns establishing a negative pressure at the "static" port 20 of the vehicle. By locating the port 20 nearer the reducer section 17 than to the nose section 12, the compensative effect of the reducer section 17 as sensed at port 20 in the body section, will predominate whereas by locating the port 20 more forwardly along the body section 15 (or 15A) the negative effect of the reducer section 17 will be felt less, and that of the nose section 12 will be increased. Thus, by appropriate selection of location of port 20, one or the other of the compensative effects may be favored.

Figure 4:
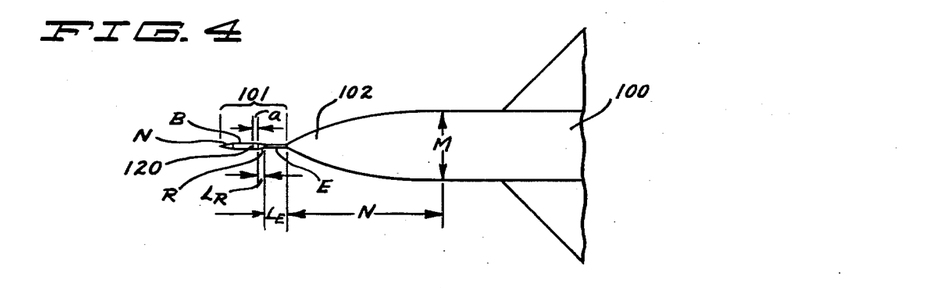
FIGURE 4 is a fragmentary plan view of an aerodynamic vehicle utilizing the invention.

In FIGURE 4 an application of the invention is illustrated with reference to an aerodynamic vehicle 100, such as a jet aircraft, and a device embodying the present invention, which is shown under bracket 101, may be considered as an adjunct of the vehicle 100, from which it derives support and velocity. The device shown under the bracket 101 is normally called a "probe" and it is normally attached to a most forward position on the aerodynamic vehicle 100. It may, if desired, be mounted on a wing.

The probe 101, of FIGURE 4, may be any of several varieties depending upon whether only the static pressure or both Pitot and static pressures are to be measured. Various probes of this catagory are illustrated in FIGURES 7–17.

Referring to FIGURES 4 and 7 through 9, the vehicle 100 has a fuselage or body portion having a size M at a distance N rearwardly from its nose 102. The ratio of $N/M$ is often called the "slenderness" ratio. The probe 101 is here illustrated as attached to the nose of the fuselage and projects forwardly in the normal direction of motion of the vehicle.

The probe has a stem E which can be made as shown in FIGURES 14 and 17 and which projects a distance $L_E$ forwardly from the nose 102 of the vehicle. A reducer section R which has a length $L_R$, a body B which has a length $L_B$, and a nose N which has a length $L_N$. The stem E, reducer R, body B and nose N can be made integrally or of separate sections fastened together and are all arranged co-axially in succession and have a common centerline.

The stem E which is normally made of circular cross-section has a radius $R_E$ and the body B which is likewise normally made of circular cross-section and has a radius $R_B$. The reducing section may be shaped as a frustroconical section, or may be smoothly curved or of compound shape, according to FIGURES 10 through 13, hereinafter described.

Figure 7:
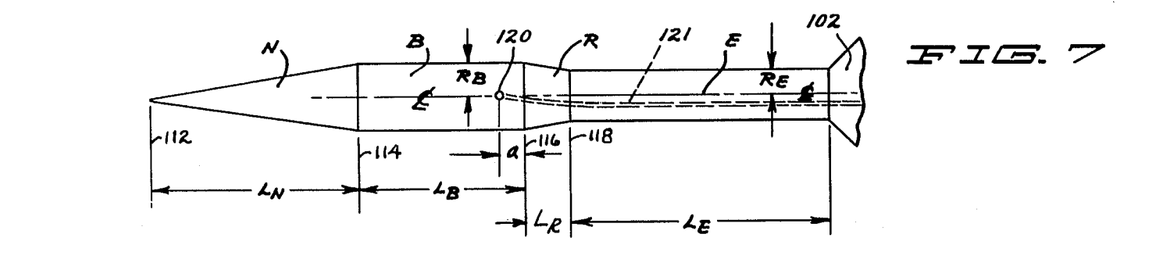
FIGURE 7 is an enlarged side elevational view of the probe portion of the device shown in FIGURE 4 utilizing the invention.
Figure 8:
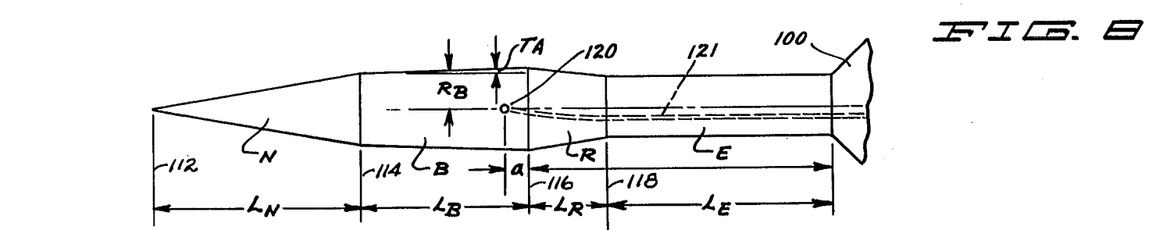
FIGURE 8 is an enlarged side elevational view of a slightly modified form of probe, of the type used on a vehicle as shown in FIGURE 4 and utilizing the invention.

In FIGURE 8 the probe is identical with that shown in FIGURE 7 except that the body B is a very slightly tapered frustoconical section in which the diameter increases very slightly in the downstream direction, or to the right as shown in FIGURE 8. The taper angle is illustrated at TA in FIGURE 8.

In FIGURES 7 and 8 the probe is made for measuring only the static pressure and a probe aperture 120 is provided at the surface of the body B. This probe aperture is connected by means of a tube 121 to suitable measuring instrument located within vehicle 100. Such measuring instrument may be an absolute pressure instrument, such as illustrated at 22 in FIGURE 1, previously described, or may be a reference pressure instrument such as that illustrated at 26 in FIGURE 2 where another reference pressure such as Pitot pressure is elsewhere generated on a vehicle, or a separate reference pressure of constant magnitude is elsewhere provided within the vehicle.

Figure 9:
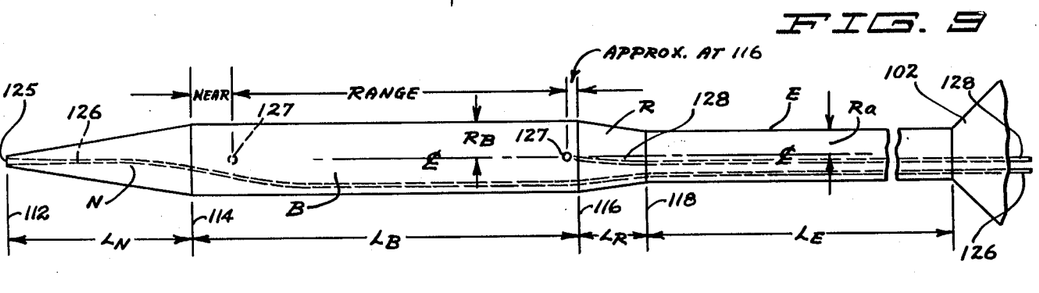
FIGURE 9 is a side elevational view of a Pitot-static probe utilizing the invention and of a type used on a vehicle such as shown in FIGURE 4.

In FIGURE 9 there is illustrated a probe which is made so as to provide ports for measuring not only the static pressure but also the Pitot pressure. The probe includes a stem E which is attached to the nose 102 of the vehicle 100. The stem connects directly to a reducing section R which is connected to a body portion B of slightly larger size than the stem E and the body is provided with a nose N which is provided at its forward end with a forwardly facing Pitot aperture 125. This Pitot aperture is connected by means of a tube 126 which runs lengthwise through the entire probe and into the vehicle nose 102 and thence into the vehicle. The shaping of the Pitot aperture is best illustrated in FIGURE 16, which will be described. In the probe shown in FIGURE 9 the body B has a length $L_B$ which is somewhat longer than as shown in FIGURES 7 and 8. The static pressure aperture 127 is located in the surface of the body B and is connected by means of a tube 128 which extends back through the probe to the vehicle 100. Normally the tubes 126 (which carries the Pitot pressure) and tube 128 (which carries the static pressure) will be connected to a differential pressure instrument such as an air speed indicator. Water drains, etc. may be provided in these tubes as is well known.

The location of the static pressure port 127 may be at any position from approximately at the forward end of the reducer section R to a position near the rearward end of the nose section N. This range is illustrated by the dimension shown in FIGURE 9 denoted "Range."

Figure 5:
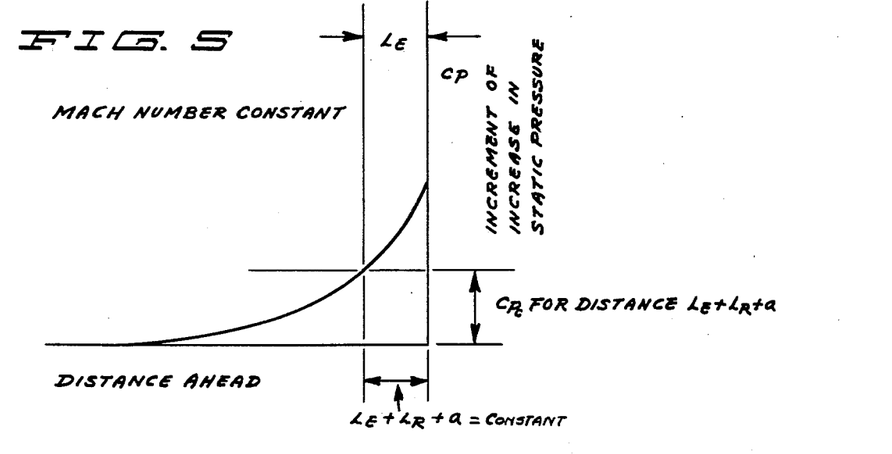
FIGURE 5 is a graph illustrating the increment of increase of "static pressure" which is felt at varying distances adhead of an aerodynamic vehicle moving at a constant speed which is less than sonic speed.
Figure 6:
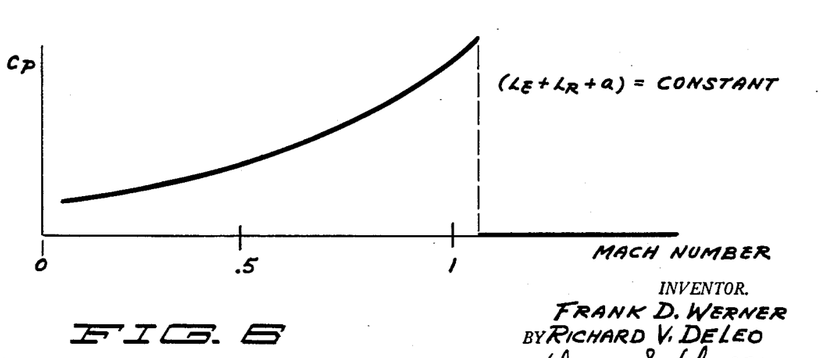
FIGURE 6 is a graph illustrating the increment of increase of static pressure at a constant distance ahead of an aerodynamic vehicle which is moving at speeds from a low speed to more than sonic speed.

Referring to FIGURES 4–9, and particularly the FIGURES 5 and 6, when a vehicle such as the vehicle 100 moves through the air, its motion will generate pressure waves which will precede the vehicle at all speeds below a speed which is just slightly above sonic speed. The reason for this is that the pressure wave will travel at the speed of sound, which, being more than the speed of the vehicle, will have an opportunity to proceed ahead of the vehicle. For a constant speed of the vehicle which is below a speed slightly exceeding sonic speed, the increment of increase in pressure in the air ahead of the vehicle, due to the vehicle speed, is as illustrated in FIGURE 5, where the increment of pressure increase is shown by the ordinate $C_P$. This increment of increase of static pressure is maximum at the nose of the vehicle and decreases as a function of distances ahead of the vehicle, and gradually approaches zero at a large distance ahead of the vehicle. The true static pressure is therefore the pressure of the air at a position in space ahead of the vehicle (or removed at some distance from the side of the vehicle) where pressure is not increased due to the wave of pressure increase occasioned by the velocity of the vehicle through the air.

As a practical matter, it is not possible to design a probe which is long enough to provide a mounting for a static pressure port which will be so far ahead of the vehicle as to be free from substantial increases in pressure occasioned by the vehicle movement at less than sonic speeds. Therefore, the design parameter has compelled acceptance of a location of the static pressure port near the vehicle, and up to the present time this has necessitated acceptance of the error in "static pressure" due to increment of increase in pressure occasioned by the velocity of the vehicle. Of course, from the mechanical standpoint a short probe is desirable.

The graph in FIGURE 6 illustrates the manner in which the increment of increase of static pressure varies with the speed of the vehicle up to and beyond sonic speeds. Thus at a position ahead of the vehicle such as the distance $L_B$ plus $L_R$ plus $a$ (which is a constant) the increment of pressure increases $C_{Pc}$ in the "static pressure" will gradually become larger as the vehicle speed increases up to and slightly beyond Mach 1, after which the increment of increase of static pressure at this distance ahead of the vehicle will abruptly drop to zero. The reason for this is that as the vehicle reaches a speed slightly exceeding sonic speed, the wave of pressure increase ahead of the vehicle can no longer travel faster than the vehicle, since this wave can only travel at sonic speeds, and the wave then settles back against the vehicle and becomes a "shock wave." The "shock wave" is very close to the nose of the vehicle, and consequently is behind the position of measurement, at the assumed constant distance ahead of the vehicle.

All aerodynamic vehicles are subject to these physical laws and while it is therefore desirable (for reducing subsonic errors in "static pressure") that the probe for measuring the static and Pitot pressures should be as long as possible, consistent with mechanical considerations, the fact that some increment of increase in static pressure will always occur has had to be accepted, even though a disadvantage.

According to this invention the probe is shaped in such a way that a compensating and corrective change in pressure is provided at the static pressure port, this corrective change being in a negative sense as compared to the increment of increase in pressure occasioned by the shape of the vehicle generally, for movement at subsonic velocities.

In general, it may be stated that probes or vehicle shapes constructed according to the present invention shall have a tapered nose section, a body section (which may be of constant size or may be tapered very slightly to an increased or decreased size in the downstream direction and that the body section is followed by a reducer section and this is followed by an extended tail piece of stem which can be the terminus of the vehicle, if it is self-propelled, or a mounting if it is an adjunct to another vehicle. The static pressure port is located on the body portion, usually relatively close to the reducer section but the position of this port may be at any place along the body portion from near the nose to a position at the junction of the body and reducer sections. The preferred location is at or near the junction of the body and reducer sections.

According to the invention a Pitot port and Pitot tube may also be incorporated into the probe or vehicle shape, and the instruments operated thereby may be either in the vehicle (if independent) or can be located in the parent or mounting vehicle on which the invention (as a probe) is located in the event the probe is not independent of the vehicle.

For supersonic speeds the distance $L_E$ is made such that this distance ahead of the point of attachment to the parent vehicle will always be ahead of the shock wave formed adjacent the point of attachment at supersonic speeds. The distance $L_E$ when calculated for supersonic speeds is always less than for subsonic or transonic speeds.

For the subsonic and transonic speeds, that is to say for Mach No. 0.5 to 1.0, the distance $L_E$ is made as long as is reasonably practical from the mechanical standpoint. At less than sonic speeds the disturbances occasioned by movement of the vehicle through the air will be sent long distances ahead of the vehicle, as illustrated with reference to FIGURES 5 and 6. Therefore, it is desirable to make the distance $L_E$ as large as possible so that the increment of pressure increased $C_P$, which is to be compensated, will be reduced to a value as low as possible but in so doing a probe which is mechanically long would result. Therefore, for practical mechanical consideration, the distance $L_E$ is not made excessive. Referring to FIGURE 4, for transonic or subsonic speeds, that is to say for speeds of Mach No. 0.5 to 1.0 the dimension $L_E$ is calculated from the dimension M of the vehicle approximately as follows: The ratio $L_E/M$ is made equal to or greater than 0.05 and is preferably made equal to or greater than 0.2. Thus, by way of example, and not by way of limitation, for a vehicle dimension M equals 60 inches the dimension $L_E$ would be not less than 3 inches and preferably not less than 12 inches.

Where the instrument is used only for detecting static pressure and does not have a Pitot port, the overall length L can be reduced, chiefly because of reduction in the dimension $L_B$. According to this invention, it has been discovered that compensating effects, in a sense opposite to the increment of pressure increases caused by movement of the vehicle through the air, are provided by locating the static pressure port 120 or 127, in that range of location on the body B ranging from the position substantially at or in the vicinity of the junction of the body B and the reducing section R up to a position near the junction of the tapered nose N and the body B. Stated another way, the location of the static pressure port is that the dimension "$a$" should range from approximately zero to a dimension of $L_B$ minus $2R_B$. The preferred location is near the junction of the body B and the reducer R.

By providing the body B with a slight taper in the downstream direction, the length $L_B$ can be shortened to some extent. Usually this slight taper is positive so as slightly to increase the size of the body in the downstream direction, but under some conditions a negative taper which decreases the size of the body in the downstream direction may be used. In FIGURE 8, the taper is illustrated as positive.

Concerning the relative sizes of the body B (radius $R_B$) and of the extension E (radius $R_E$) it may be stated that the ratio $R_B/R_E$ should be larger than unity and may be as much as 3 with the preferred range being greater than unity to about 2. The extension E must always be smaller in (cross-sectional) size than the size of the reducer section where it joins the body B, hence to provide a reducer section (restriction at R).

Insofar as concerns the static pressure compensation, that is to say the correction of the increment of increase of pressure due to the vehicle generally moving through the air, the reducer section R provides such an effect and such compensation is also effected by the effect of the nose N. That is to say, the nose N (which is ahead of the static pressure port 120 (or 127) and which increases in girth in a downstream direction) produces a compensating pressure correction at the static pressure port 120 (or 127) which is of the same sense as that produced by the reducer section R, which is behind the static pressure port 120 (or 127) and which decreases in size in the downstream direction.

The influences of the reducer section R and of the nose, both of which are corrective in respect to the increment of increase of static pressure caused by movement of the vehicle generally, are thus both of like sense, both being opposite in sense to the pressure increment caused by the vehicle proper at the static pressure port. This, of course, is for subsonic or transonic speeds at a location for the static pressure port equal to the distance $L_E$ plus $L_R$ plus $a$, ahead of the nose of the vehicle.

Hence the corrective (compensating) effect of the nose and of the reducer are both helpful. The relative effectiveness of the corrective effect of the nose section N and of the reducer section R, in respect to corrections of the increase of static pressure at the static pressure port, depends upon the dimensions $a$ and $L_B$. Where the dimension $a$ is small and the dimension $L_B$ is large, the reducer section R produces maximum effect, and the nose section will then produce little effect. As the dimension $a$ is increased, or if the dimension $L_B$ is decreased, the static pressure port is more and more influenced by the corrective effect of the nose section N and the corrective effect of the reducer section R is correspondingly decreased.

Figure 10:
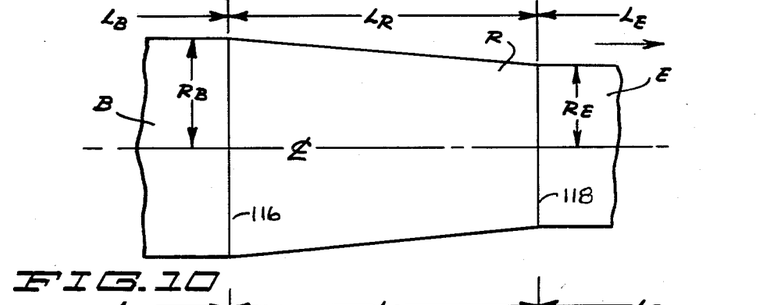
FIGURES 10, 11, 12 and 13 are enlarged fragmentary side elevational views showing various forms of reducer sections of probes constructed in accordance with the invention.
Figure 11:
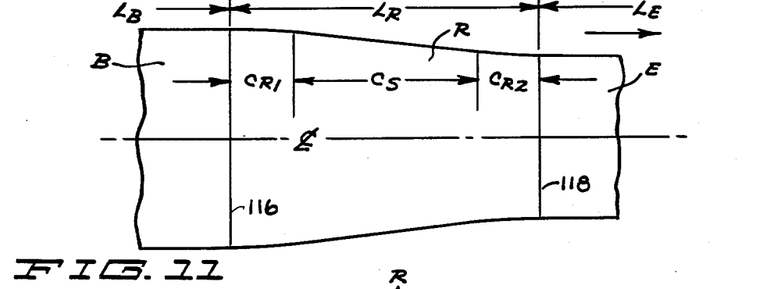

Referring to FIGURES 10–13, there are illustrated varying forms of shapes for the reducer section. In subsonic flow, the gently curving surface aft of the static port is chosen so that the flow does not separate, and in this situation, it accelerates and a low pressure area is formed. This gives the influence of a reduced pressure at the static port, and by proper choice of the geometry, as shown in FIGURES 10–13, flow separation can be avoided, and any reasonable static pressure error caused by the fuselage can be very nearly cancelled. When the flow is entirely supersonic, the shock wave in front of the airplane moves rearward past the static port, and in this case the flow is parallel to the axis of Pitot-static tube structure resulting in negligible supersonic static pressure errors. Furthermore, it is to be noted that at supersonic speeds the pressure disturbance caused by the nose of the fuselage of the parent vehicle and also that caused by the compensating shape, cannot significantly influence the static pressure at the static pressure port. In FIGURE 10 the reducer section is of frustroconical configuration, being tapered along a straight line from a maximum diameter $R_B$ to a minimum diameter $R_E$. In FIGURE 11 the reducer section includes a slightly curved portion CR1 which connects the body portion to a straight taper throughout the dimension CS and a slight curve section CR2 which connects the straight taper CS to the portion E.

Figure 12:
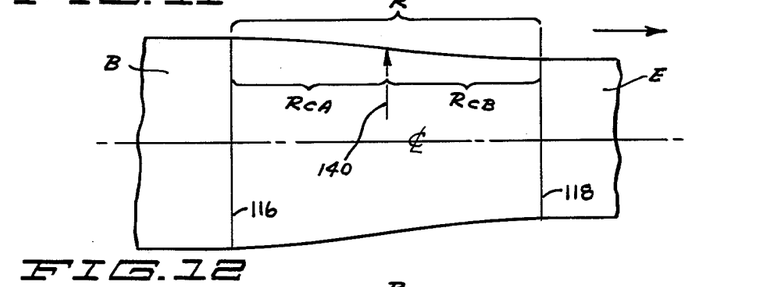

In FIGURE 12 the reducer section R is composed of two slight sinusoidal curves. The curves over the bracket RCA being convex, and this reaches from the body portion B to a position 140 which is approximately one-half way down the length of the reducer section R, and this curve RCA then blends smoothly into the curve RCB, which is smoothly connected to the portion E.

Figure 13:
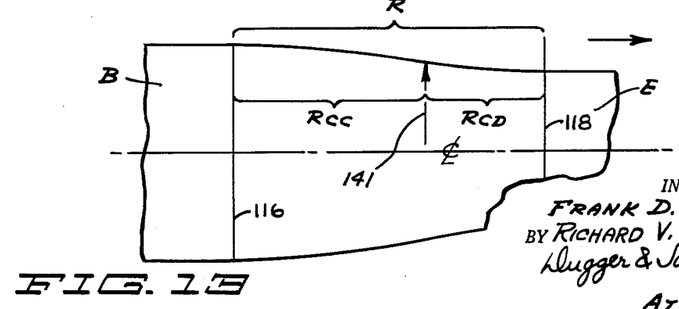

In FIGURE 13 the same system of two curves shown over the brackets RCC and RCD are used except that the curved portion RCC extends to the line 141 which is slightly downstream from a position one-half the length of the reducer R.

The configuration shown in FIGURE 10 has the advantage that it permits precise manufacturing. The configurations shown in FIGURES 12 and 13 are preferred.

There exists a critical Mach number range, typically between 0.97 and 1.01, in which supersonic flow occurs at some region along the compensating surface, aft of the static pressure ports. This supersonic flow isolates a part of the compensating surface and reduces the compensation which it can effect, but at the same time this small supersonic area also tends to shield some of the static pressure error caused by the fuselage, and in this speed range the performance is not precisely defined by theory. The qualitative effects tend to cancel, however. Generally poor airplane performance in this range is to be expected and it is considered to be of reduced importance.

The advantages of a single port for both supersonic and subsonic flow are readily apparent, as are the advantages of avoiding the necessity for a computed correction within the central air data computer, or other instruments which depend on static pressure.

In FIGURE 14 there is illustrated an embodiment of probe structure built according to the present invention, for use on an aircraft which travels at speeds up to and exceeding Mach 1. In this structure the nose 102 of the vehicle serves as a mounting for the probe, which in this instance has a stem 200E shown over the bracket 200, the stem being of maximum girth at 201 where it is attached to the vehicle 102. The stem is then tapered as at 202 (in a forward direction, i.e. to the left in FIGURE 14) to a dimension 203, which extends forwardly to the line 204, which is the rearward end of the reducer section R, shown over the bracket 205. From the reducer section the probe continues throughout the body 206 at the same maximum diameter of the reducer, to the rear end of the nose, this being the body portion shown over the bracket 207. Forwardly of the body there is a nose section 210 which tapers in the forward direction, and at the front end is more sharply tapered at 211, as illustrated at angle Y, in FIGURE 16. It will be noted that this forward end of the nose is provided with a port 212, which is slightly tapered at 213 at its forward inner surface, so that the inner and outer tapers meet at a forward circular edge 214 defining port 212. The Pitot port 212 is connected by an internal tube 215 which terminates at the tube 215A within the vehicle 102, see FIGURE 14. At a distance $a$ ahead (to the left) of the tapered section R there are provided one or more static pressure ports 220, preferably two ports being provided as illustrated in the section FIGURE 15. These ports are joined together at the junction 221 from which a tube 222 extends to the connection 222A within the vehicle 102, see FIGURE 14. The two ports 220—220 are located X degrees from vertical as measured from the bottom of the probe, the dimension X preferably being in the range of 15–40 degrees. The reducer section R is preferably made according to the shape shown in FIGURE 12. The ratio of $R_E/R_B$ is less than unity and is preferably in the range of about 0.8 to about 0.95.

In FIGURE 17 the construction is precisely the same as shown in FIGURE 14 except that the body 206 is provided with a slight taper at portion 206A amounting to approximately 0.5 degrees, increasing in girth in the downstream direction i.e. to the right in FIGURE 17.

FIGURE 17 shows a typical configuration for a nose boom installation. The rear portion 206A of the body 206 has an increase in diameter, from about 0.03 to 0.10 inches (depending on compensation requirements) in the vicinity of the static port, this being provided by the taper. In supersonic flow, there is actually a small tendency for reduced pressure at the static ports because of flow around the nose cone itself. Because of this, the best possible results are obtained when there is a slight taper forward of the subsonic compensating surface.

In FIGURE 3 an electrical heater for de-icing is illustrated for that portion of the nose closely adjacent the Pitot port. It will be understood that electric heaters can similarly be embedded in all or any portion of the walls of the entire Pitot-static tube so as to provide sufficient exterior heat to de-ice the entire exterior surface.

As many apparently widely different embodiments of this invention may be made without departing from the spirit and scope thereof, it is to be understood that we do not limit ourselves to the specific embodiments disclosed herein.

What we claim is:

1. An aerodynamic object of elongated slender configuration and being composed of a nose section, a body section of substantial length, a reducing section and a rear stem in series from the front end to the rear end, said nose being tapered and increasing in section to the size of the body, said reducing section being reduced in cross-section in a rearward direction to where it joins the stem, said stem being continued to the rear end, said object being characterized in that a static pressure port is provided on the exterior surface of the body section and at a location ranging from a position ranging from the junction of the body and reducer sections to a position near the junction of the nose and body section, said port being adapted to be connected to a pressure instrument.

2. The aerodynamic object specified in claim 1 further characterized in that the body section is changed slightly in cross-section in a rearward direction but at a lesser rate than the nose is increased.

3. The aerodynamic object specified in claim 1 further characterized in that the nose terminates at its forward end as an aperture.

4. The aerodynamic object specified in claim 1 further characterized in that the aerodynamic object is provided with an electrical heating unit embedded therein adjacent the exterior surfaces thereof for de-icing.

5. A static pressure probe for an aerodynamic vehicle comprising an elongated body having one end formed as a mounting adaptor shaped so as to be attached to a forward part of an aircraft with the probe position so as to extend in the direction of motion of the vehicle outward ahead of the vehicle said probe from its extreme forward end to its mounting adaptor including in succession in the downstream direction a nose section which increases from a minimum cross-section at the extreme forward end and then gradually increases in cross-section to a larger cross-section, a body portion wherein said larger cross-section is at least substantially maintained, a reducer section wherein the cross-section decreases from said larger cross-section to an intermediate cross-section and a mounting stem of said intermediate cross-section extending from the reducer section downstream to said mounting adaptor, a fluid pressure duct extending through the probe from a position in said mounting adaptor which is within the vehicle when the device is mounted thereon and thence through the stem to a port in the surface of said body portion, said port being ahead of said reducer section and behind said nose section.

6. The probe specified in claim 5 further characterized in that a second duct is provided throughout the length of the probe from said mounting adaptor to the extreme forward end of said nose section, said duct terminating as a forwardly facing Pitot port on the extreme forward end of the nose section.

7. The probe specified in claim 5 further characterized in that said body portion varies in cross-section in a downstream direction but at a rate of change substantially less than the rate of increase throughout the length of said forward section.

8. The probe specified in claim 5 further characterized in that all sections are circular.

9. The probe specified in claim 5 further characterized in that the extreme forward end of said nose section is a point.

10. The probe specified in claim 5 further characterized in that the changes of cross-section from the body portion to the reducer section and from the reducer section to the stem are in the form of smoothly blended curves.

11. The probe specified in claim 5 further characterized in that the ratio of the length of the stem to the maximum transverse dimension of the aircraft is not less than 0.05.

12. The probe specified in claim 5 further characterized in that all cross-sections are circular and that the ratio of the radius of the body portion cross-section to the radius of the stem cross-section is from about 1 to about 3.

References Cited in the file of this patent

UNITED STATES PATENTS

| | | |
|---|---|---|
| 2,399,370 | McOrlly | Apr. 30, 1946 |
| 2,876,640 | Beach et al. | Mar. 10, 1959 |

OTHER REFERENCES

Publication NASA TR R–18 by Virgil S. Ritchie, "Several Methods of Aerodynamic Reduction of Static-Pressure Sensing Errors for Aircraft at Subsonic, Near Sonic, and Low Supersonic Speeds," dated Aug. 4, 1959. Copy is available in Patent Office Library.

UNITED STATES PATENT OFFICE
CERTIFICATE OF CORRECTION

Patent No. 3,120,123                                            February 4, 1964

Frank D. Werner et al.

It is hereby certified that error appears in the above numbered patent requiring correction and that the said Letters Patent should read as corrected below.

Column 1, line 42, after "having" insert -- static --; column 2, line 2, for "adhead" read -- ahead --; line 28, for "FIGURES" read -- FIGURE --.

Signed and sealed this 30th day of June 1964.

(SEAL)
Attest:

ERNEST W. SWIDER                                        EDWARD J. BRENNER
Attesting Officer                                           Commissioner of Patents